United States Patent Office — 3,413,377 — Patented Nov. 26, 1968

3,413,377
RESINS OF POLY(EPOXYALKYL-2-OXAZOLIDI-NONE), PHENOLIC BASED POLYEPOXIDES AND MONOEPOXY COMPOUNDS
Charles H. Schramm and Morris Zief, Easton, Pa., assignors to J. T. Baker Chemical Company, Phillipsburg, N.J., a corporation of New Jersey
No Drawing. Continuation-in-part of application Ser. No. 515,439, Dec. 21, 1965. This application Apr. 28, 1966, Ser. No. 545,874
10 Claims. (Cl. 260—830)

ABSTRACT OF THE DISCLOSURE

Polymerizable compositions may be prepared from polyepoxyoxazolidinone of the formula

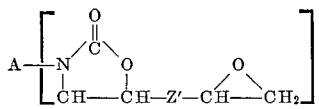

wherein A is a divalent hydrocarbon having 4 to 12 C, Z' is an alkylene group of 1 to 18 C, divalent polyalkylene, or chloro-substituted polyoxyalkylene.

These polyepoxyoxazolidinones are reacted with polyglycidyl ethers of polyhydric phenols, and monoepoxy flexibilizers.

From 0.2 to 4 pts. of the polyepoxyoxazolidinone is used for each pt. of the polyglycidyl ether, and 3% to 70% of the monoepoxy flexibilizer is used based on the total of the other 2 components.

Oxazolidinone diepoxides may be prepared from the reaction of polypropylene glycol, and epichlorohydrin, followed by further reaction with toluene diisocyanate.

---

This application is a continuation-in-part of our copending application Ser. No. 515,439, filed on Dec. 21, 1965, now abandoned.

This invention relates to novel polymers. More particularly it relates to novel polymers prepared by polymerizing a mixture containing a polyepoxyoxazolidinone, a phenolic based polyepoxide, and a monoepoxy compound.

Conventional phenolic based polyepoxide resins are rigid systems which possess low flexibility and little elongation. Various additives such as plasticizers, flexibilizers and other diluents have been used to improve the flexibility and elongation of the phenolic based polyepoxy compounds. However, these additives produce various shortcomings in the physical and chemical properties of the polymers.

Polyepoxyoxazolidinones, also referred to as polyepoxyoxazolidones, can be admixed with the phenolic type resins to produce polymers having good physical and chemical properties. Notwithstanding the desirable physical and chemical properties of such polymers, there is a need for additives to provide additional desired properties, including increased flexibility and elongation, with little or no loss of tensile strength. Various diluents, plasticizers or flexibilizers, when added to a mixture of the phenolic based polyepoxides and polyepoxyoxazolidinones are unsatisfactory in providing desirable properties in the cured mixtures. Some of the additives give little or no increased elongation whereas others, although providing increased elongation, adversely affect other properties of the polymers.

It has now been found that polymers prepared from mixtures containing a phenolic based polyepoxide, a poly(epoxyalkyl-2-oxazolidinone), and a monoepoxy flexibilizer have many desirable physical and chemical properties including improved elongation with little loss in other desirable physical and chemical properties. The use of certain classes of the monoepoxy flexibilizers gives polymers with increased elongation while other physical and chemical properties of the polymers remain substantially the same, and in some instances, better than the phenolic based polyepoxide-polyepoxyoxazolidinone polymers without the flexibilizer. Advantageous properties of the novel mixtures and polymers include: reduced viscosity of the monomeric mixture; whereas the polymers show increased elongation with little sacrifice in tensile strength, decreased water absorption, retention of high flexibility and good tensile strength on heat aging of the polymers, good impact resistance, abrasion resistance, and good cohesive and adhesive properties.

Polyepoxyoxazolidinones are described in the literature, e.g., Belgian Patents 647,000 and 646,999, which were granted on Apr. 23, 1964. They can be prepared by reacting a polyisocyanate with a poly(halohydrin) in a quantity sufficient to provide two or more halohydrin groups per isocyanate group. The reaction can be conducted in the presence of a catalyst such as stannous octoate at temperatures ranging from about 15° C. to 120° C. to produce a poly(beta-halourethano)halohydrin which is then dehydrohalogenated, e.g., by use of 50% sodium hydroxide solution, to form the polyepoxyoxazolidinone.

The term "polyisocyanate" refers to compounds containing two or more isocyanate (—NCO) groups. The term "polyhalohydrin" refers to compounds containing two or more halohydrin

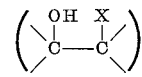

groups wherein X is halogen. The term "beta-halourethano" refers to the radical

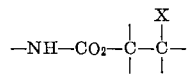

wherein X is halogen. The term "epoxide" or "epoxy" refers to the oxirane group

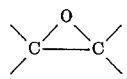

The term "residue" in reference to organic polyisocyanates refers to the organic portion of a polyisocyanate compound exclusive of the reactive isocyanate groups. This term, as applied to polyisocyanates, indicates a polyvalent radical, e.g., tolylene, which was once part of a reactive polyisocyanate which through one or more reactions makes up a part of the compound in question. The term "residue" in reference to a poly(halohydrin) refers to the organic portion of the poly(halohydrin) exclusive of the halohydrin groups.

Polyisocyanate reactants suitable for use in the preparation of the polyepoxyoxazolidinones can be represented by the formula $R(NCO)_n$ wherein $n$ is an integer representing the number of isocyanate groups, e.g. 2 to 4 but preferably 2, and R represents the organic residue of a polyisocyanate. This formula includes a wide variety of organic polyisocyanates, including aromatic, aliphatic, and cycloaliphatic diisocyanates and other polyisocyanates. Preferably the polyisocyanate residue is a hydrocarbon having from about 4 to 12 carbon atoms, e.g., alkylene, arylene such as phenylene or naphthalene, and alkylarylene such as tolylene. Representative polyisocyanates include: tolylene 2,4-diisocyanate; m-phenylene diisocyanate; 4-chloro-1,3-phenylene diisocyanate; 4,4'-bisphenylene diisocyanate; diphenylmethane 4,4'-diisocyanate; 1,5-naphthalene diisocyanate; 1,4-tetramethylene diisocyanate; 1,6-hexamethylene diisocyanate; 1,10-decamethylene diisocyanate; 1,4-cyclohexylene diisocyanate; 4,4'methylene bis(cyclohexylisocyanate); 1,5-tetrahydronaphthalene diisocyanate; and the like. Commercial mixtures of tolylene-2,4-diisocyanate and tolylene-2,6-diisocyanate are preferred on the basis of economics.

Illustrative of poly(halohydrin) reactants suitable for preparing the polyepoxyoxazolidinones there can be mentioned: 1,4-dichlorobutanediol-2,3; 1,4-dibromobutanediol - 2,3; 2,3 - dichlorobutane diol - 1,4; 2,3 - dibromobutanediol - 1,4; vinyl cyclohexane dichlorohydrin; epichlorohydrin adducts of various polyols including glycerol, sorbitol, polyvinyl alcohol and poly(oxyalkylene) glycols such as polyethylene glycol and polypropylene glycol. Preferably, the poly(halohydrin) is an epichlorohydrin adduct of a poly(oxyalkylene glycol) having from 2 to 4 carbon atoms in each alkylene chain, for example an epichlorohydrin adduct of: polyethylene glycol; polypropylene glycol; polybutylene glycol; and the like. Preferably, the poly(oxyalkylene)glycols have molecular weights of about 100 to about 3,000, and particularly from about 150 to 1,000. In preferred compositions, the poly(halohydrin) will have a molecular weight of not greater than 1,000 and will be a liquid.

Poly(epoxyoxazolidinones) employed in this invention can be represented by the formula

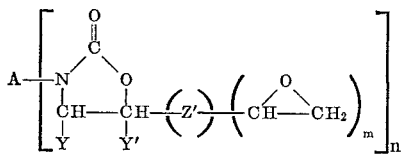

wherein A is the organic residue of a polyisocyanate, e.g., tolylene; Z' is an aliphatic group; n is an integer from 2 to 4 but preferably 2; m is an integer from 1 to 3 but preferably 1, and either Y or Y' is hydrogen and the remaining Y or Y' represents a covalent bond connecting the oxazolidone ring to Z'. The aliphatic group as represented by Z' can be selected from groups consisting of alkylene, substituted alkylene, alkyleneoxy, cycloalkylene and substituted cycloalkylene and radicals made up of two or more of each of these groups or mixtures thereof. The alkylene, substituted alkylene, alkyleneoxy, cycloalkylene and substituted cycloalkylene groups can have from 1 to about 18 carbon atoms in each of the groups, although these groups can be joined, e.g. the oxyalkylene portion of a poly(oxyalkylene)glycol, to form groups having molecular weights as high as 4,000 or more. Substituents on the above recited substituted groups are preferably alkyl or halogen, e.g., chloro. Preferably, the polyepoxyoxazolidinones employed in this invention are represented by the following formula:

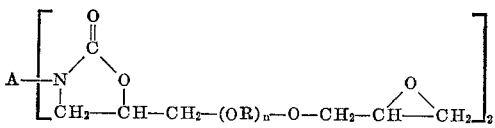

wherein: A is the organic residue of a diisocyanate; R is a member selected from alkylene and chloro-substituted alkylene having from 1 to 4 carbon atoms, e.g.

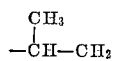

or

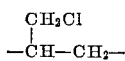

n is an integer representing repeating units of said (OR) groups having a total molecular weight of from about 150 to 1,000. It can be seen that (OR)$_n$ represents the same number of (OR)$_n$ groups as found in a poly(oxyalkylene)glycol [H(OR)$_n$OH] having a molecular weight of about 150 to 1,000.

The phenolic based polyepoxides are preferably epichlorohydrin adducts of Bisphenol A, e.g., the diglycidyl ether of bis(4-hydroxyphenyl) dimethylmethane, although the diglycidyl ethers of resorcinol, hydroquinone, pyrocathechol, phloroglucinol, 4,4'-dihydroxybiphenyl, 4,4'-dihydroxydiphenylsulfone may also be employed. In addition the glycidyl ethers of novolacs, such as Dow's D.E.N. 438 epoxy novolacs, are also useful. Preferably, the phenolic based polyepoxides are liquids, including highly viscous liquids at room temperature.

Broadly, the monoepoxy flexibilizers are well known for flexibilizing the phenolic based polyepoxy resins. Illustrative as suitable monoepoxy flexibilizers, there can be mentioned: the glycidyl ether of nonyl phenol; the glycidyl ether of dodecyl phenol; phenol glycidyl ether; butyl glycidyl ether; monoglycidyl ethers of poly(oxyalkylene)-glycols, e.g., polyethylene glycol or polypropylene glycol having a molecular weight of about 150 to about 1,000 or more; and the glycidyl ether of an alkanol having from 8 to 10 carbon atoms. In the case of the monoglycidyl ethers of poly(oxyalkylene)glycol flexibilizers, the flexibilizer molecule contains one epoxy group and one hydroxy group. Preferred monoepoxy flexibilizers can be represented by the formula

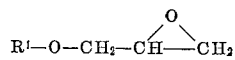

wherein R$^1$ is hydrocarbyl having from about 6 to 16 carbon atoms. Illustrative of R$^1$ there can be mentioned aryl such as phenyl or naphthyl and alkyl such as straight or branched chain octyl, decyl, and the like. Particularly preferred is the glycidyl ether of an alkanol having from 8 to 10 carbon atoms and phenyl glycidyl ether.

The quantities of the various ingredients in the compositions of this invention can vary over a broad range. Illustratively, the ratio of polyepoxy compounds can vary from about 0.2 to 4 parts (by weight) of the polyepoxy-oxazolidinone per part of the phenolic based polyepoxide and preferably from about 0.3 to 1 part of the polyepoxy-oxazolidinone for each part of the phenolic based polyepoxide. The quantity of the monoepoxy flexibilizer can vary over a broad range such as that of from about 3% to 70% based on the total quantity (by weight) of the polyoxazolidinone and phenolic based polyepoxide, preferably from about 5% to 60% and particularly from about 15% to 45%, based on the total quantity of polyepoxyoxazolidinone and phenolic based polyepoxide.

Conventional techniques are employed in preparing the resins of this invention. Thus, they can be prepared by the simple expediency of mixing together the various components at room temperature together with a cross-linking type of epoxy curing agent. Alternatively, the materials can be mixed together and packaged and the curing agent added at the time of use. Preferably, the curing agent is a polyfunctional amine, or an aliphatic polycarboxylic acid anhydride. The compositions cure at room or elevated temperatures if a polyfunctional amine is employed as the curing agent, whereas an anhydride curing agent generally requires elevated temperatures to effect the cure such as that of from about 70° C. to 110° C. The polyfunctional amine, i.e., an amine having at least two active amino hydrogen atoms which can be on the same nitrogen atom or different nitrogen atoms is employed in amounts sufficient to provide between about 0.2 and 4.0 amino hydrogen atoms per epoxy group of the mixture, and preferably between 0.5 and 2.0 amino hydrogen atoms per epoxy group, although it is preferable to use the stoichiometric quantity of the polyfunctional amine required to react all the epoxy groups in the mixture. Suitable polyfunctional amines include monoamines, diamines, triamines and higher polyamines such as 2-ethylhexylamine; aniline; phenethylamine; cyclohexylamine; 2-aminophenol; ethylenediamine; butylenediamine; hexamethylenediamine; dihexylenetriamine; diethylenetriamine; triethylenetetraamine; dipropylene triamine; m-phenylene diamine; p-phenylenediamine; aminoethylpiperazine; and the like.

Polycarboxylic acid anhydrides which can be employed as the curing agent include the anhydrides of maleic acid, succinic acid, citraconic acid, itaconic acid, and the like. The amount of anhydride as a curing agent is about the stoichiometric quantity or preferably about 0.85 gram mole of anhydride carboxyl per one gram mole of epoxy. Of course, this can be varied as is generally customary in the art.

The flexibilized polymers of this invention can be used as castings; coatings; electrical casting; capsulant and potting compounds; in filament winding; industrial flooring; sealants, e.g. preformed gaskets or they can be applied as a liquid and cured in situ for applications such as sealing the adjacent ends of concrete pavement or sealing windows within their metal frames; molding resins and tooling compositions. They can be used for much the same applications as the conventional phenolic based polyepoxide resins and have the advantage of flexibility. Polymeric compositions of this invention can have elongations which vary over a wide range such as that of over 100% and preferably over 150 or 200% elongation at break, i.e. the elongation at the moment of rupture.

The terms "oxazolidinone" and "oxazolidone" refer to the same group and are used interchangeably.

The following examples are illustrative of the invention:

EXAMPLE 1

A. A polyether dioxazolidone diepoxide (hereinafter referred to as Product A) was prepared in accordance with the procedure of this paragraph A. One mole of polypropylene glycol having a molecular weight of about 400 and boron trifluoride etherate (0.5 ml.) were placed in a 1,000 ml. 3-neck flask; controlling the temperature of the reaction at about 85° C., epichlorohydrin (2 moles) was added dropwise in the flask to produce the dichlorohydrin of the propylene glycol. After the addition was complete and no further exotherm developed, the temperature was raised to about 95° C. for 30 minutes. The excess catalyst was then neutralized with calcium oxide. To the above dichlorohydrin there was added dichloroethane (300 ml.) and stannous octoate catalyst (0.5 ml.) in a 1,000 ml. 3-neck flask; with stirring there was added tolylene diisocyanate (2,4-2,6-isomers) in a molar ratio of dichlorohydrin to tolylene diisocyanate of 2:1. The reaction temperature was controlled between about 5° C. and 10° C. for 3 hours and then the temperature was allowed to climb to room temperature overnight. The condensation product of the tolylene diisocyanate and the dichlorohydrin was then dehydrohalogenated by contact with an aqueous 50% solution of sodium hydroxide. The dehydrohalogenation temperature was controlled at about 70° C. and allowed to run with vigorous stirring for about 2½ hours, at which time it was cooled and the excess alkali neutralized with carbon dioxide. The solids were filtered off and the polyether dioxazolidonediepoxide, i.e. the di(epoxyalkyl-2-oxazolidinone) filtrate was concentrated to a syrup having a Brookfield viscosity of 2,480 cps. (25° C.), epoxide equivalent weight 600. The preparation of a number of very similar polyepoxyoxazolidinones are described in U.S. patent application Ser. No. 515,149, filed on Dec. 20, 1965.

B. Product A (28.5 g., 0.045 epoxy equivalent) and Shell 828 [1] (28.5 g., 0.15 equiv.) were mixed with 8.6 g. of aminoethylpiperazine. After curing at room temperature for one week this formulation showed:

Tensile=3,000 p.s.i.

Elongation at break=67% (ASTM D412, 2 inches per minute)

C. Dilution with 10% phenyl glycidyl ether: A panel was prepared from Product A (38 g.), Shell 828 (38 g.) phenyl glycidyl ether (7.5 g.; 10% by weight of resin content) and aminoethylpiperazine (13.5 g.). After curing at room temperature for one week, tensile=2,950 p.s.i.; elongation at break=104%.

D. Dilution with 10% monoglycidyl ether of polyethylene glycol 300: A panel was prepared from Product A (38 g.), Shell 828 (38 g.), monoglycidyl ether of polyethylene glycol 300 (7.5 g., 10% by weight of resin content) and 12.2 g. of aminoethylpiperazine.

After curing at room temperature for one week, tensile=1,900 p.s.i.; elongation at break=108%.

E. Dilution with allyl glycidyl ether: A panel was prepared from Product A (30 g.), Shell 828 (30 g.), allyl glycidyl ether (7.5 g.; 12.5% of resin content) and 11.7 g. of aminoethylpiperazine. After curing at room temperature for one week, tensile=1,650 p.s.i.; elongation at break=158%.

F. Dilution with glycidyl ether of $C_8$–$C_{10}$ alcohol:[2] A panel was prepared from Product A (51 g.), Shell 828 (38 g.), glycidyl ether of $C_8$–$C_{10}$ alcohol (9 g.) and 15 g. of aminoethylpiperazine. After curing at room temperature for one week, the tensile strength of a specimen was 2,200 p.s.i., and elongation at break was 177%. Two similar experiments were made wherein the Product A was left out of the formulation. When the Shell 828 resin and the glycidyl ether of $C_8$–$C_{10}$ alcohol was used in equal quantities (without Product A) a very soft resin was produced with little strength; also, when the ratio of Shell 828 to the monoglycidyl ether was 3:1, a resin resulted with very little elongation.

EXAMPLE 2

Fifty grams of Product A of Example 1 was mixed thoroughly by stirring with 50 g. of the mixture of monoglycidyl ethers from octanol and decanol. This mixture had an oxirane oxygen content of 4.95%. This flexibilizer mix was added to 100 g. of Epon 828 (Shell Chemical Co), stirred thoroughly, and then degassed under vacuum. To this mixture there was added 36.1 g. of N-aminoethylpiperazine and the mixture was stirred at moderate speed to prevent the formation of air bubbles for a time interval of less than 5 minutes. This mixture was then poured into mold designed to give a sheet of ⅛″ thickness. The sample was cured in the mold for two days in an environment of 23° C. and 50% relative humidity. The casting was then removed from the mold and allowed to cure for an additional 5 days (total cure =7 days) in the same environment. The properties of the cast sheet were then measured after this "room temperature" cure and after heat aging for 48 additional hours at 105° C. The results are tabulated below:

| Property | 7 Day RT Cure | 7 Day RT Cure Plus 48 hrs. at 105° C. |
|---|---|---|
| Tensile, max., p.s.i. | 1,350 | 2,275 |
| Elong. at break, percent | 297 | 161 |
| Shore D Hardness | 55–40 | 70–60 |

What is claimed is:

1. A polymerizable composition comprising:
(a) A polyepoxyoxazolidinone of the formula

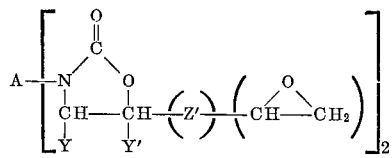

wherein A is a divalent hydrocarbon group having from 4 to 12 carbon atoms; Z' is an aliphatic group selected from structures consisting of alkylene of 1 to 18 carbon atoms, a divalent poly(oxyalkylene) group of divalent chloro-substituted poly(oxyalkylene group, said poly(oxyalkylene) or chloro-substituted poly(oxyalkylene) group having a molecular weight of from 150 to 1000, and one of Y and Y' is hydrogen and the other is a covalent bond to Z';
(b) a polyglycidyl ether of a polyhydric phenol;

---

[1] Diglycidyl ether of Bisphenol A sold by the Shell Chemical Company.

[2] $C_8$–$C_{10}$ alcohol is a mixture of alkanols having 8 to 10 carbon atoms.

(c) a monoepoxy flexibilizer selected from the group consisting of
(i) a monoepoxy compound of the formula

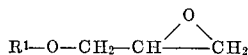

wherein $R_1$ is hydrocarbyl having from 6 to about 16 carbon atoms, said hydrocarbyl being a member selected from the group consisting of phenyl, alklphenyl and alkyl,
(ii) a monoglycidyl ether of a poly(oxyalkylene)glycol having a molecular weight of 150 to 1000, and
(iii) allyl glycidyl ether; and wherein said composition contains from about 0.2 to 4 parts, by weight, of the polyepoxyoxazolidinone for each part of the polyglycidyl ether of polyhydric phenol and from about 3% to 70% of the monoepoxy flexibilizer based on the total weight of the polyepoxyoxazolidinone and polyglycidyl ether of polyhydric phenol in the composition.

2. A polymerized composition of claim 1 prepared by contacting said composition with an epoxy curing agent in an amount sufficient to effect cross-linking, said curing agent selected from the group consisting of a polyfunctional amine having at least 2 active amino hydrogen atoms and an aliphatic polycarboxylic acid anhydride.

3. A polymerized composition of claim 2 wherein the curing agent is an amine having at least 2 amino hydrogen atoms.

4. A polymerized composition of claim 3 wherein the monoepoxide is a member selected from the group consisting of phenyl glycidyl ether and the glycidyl ether of an alkanol having from 6 to 16 carbon atoms.

5. A polymerizable composition comprising:
(a) a polyepoxyoxazolidinone compound of the formula:

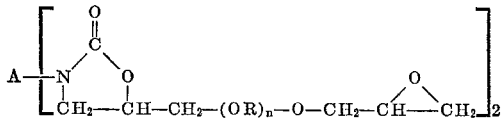

wherein A is the organic residue of a diisocyanate, R a member selected from alkylene and chloro-substituted alkylene having from 1 to 4 carbon atoms, $n$ is an integer representing repeating units of said (OR) groups, said (OR) groups having a total molecular weight of from about 150 to 1000;
(b) a polyglycidyl ether of a polyhydric phenol selected from the group consisting of an epoxylated novolac and a diglycidyl ether of isopropylidene bis(4-hydroxyphenyl);

(c) a monoepoxy compound of the formula

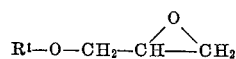

wherein $R^1$ is hydrocarbyl having from 6 to about 16 carbon atoms said hydrocarbyl being a member selected from the group consisting of phenyl, alkphenyl and alkyl; and
(d) said composition containing from about 0.3 to 1 part, by weight, of the polyepoxyoxazolidinone for each part of the polyglycidyl ether of a polyhydric phenol and from about 5% to 60% of the monoepoxy compound based on the weight of the polyepoxyoxazolidinone and polyglycidyl ether of a polyhdric phenol.

6. A polymerized composition of claim 5 including an amine curing agent for epoxy compounds said amine having at least two amino hydrogen atoms, wherein R in said (OR) group is propylene, A is tolylene and wherein the said polyepoxyoxazolidinone is a liquid.

7. A polymerized composition of claim 6 wherein the amine catalyst is aminoethylpiperazine.

8. A composition of claim 7 wherein the monoepoxy compound is of the formula

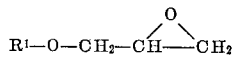

wherein $R^1$ is alkyl of 8 to 10 carbon atoms.

9. A polymerizable composition comprising:
(a) a diepoxyoxazolidinone, normally in the liquid state, of the formula:

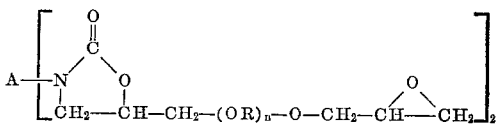

wherein A is tolylene, R is propylene and $n$ represents repeating units of the (OR) oxypropylene group;
(b) the diglycidyl ether of isopropylidene bis(4-hydroxyphenyl); and
(c) a monoglycidyl ether of an alkanol having 8 to 10 carbon atoms, said composition containing from about 0.3 to 1 part by weight of the polyepoxyoxazolidinone for each part of the diglycidyl ether of isopropylidene bis(4-hydroxyphenyl) and from about 15% about to 45% of the monoglycidyl ether of said alkanol based on the total weight of the polyepoxyoxazolidinone and the diglycidyl ether of isopropylidene bis(4-hydroxyphenyl).

10. A polymerized composition of claim 9 having an elongation at break of at least 200%.

No references cited.

MURRAY TILLMAN, *Primary Examiner.*

PAUL LIEBERMAN, *Assistant Examiner.*